US011751674B2

United States Patent
Barber et al.

(10) Patent No.: US 11,751,674 B2
(45) Date of Patent: Sep. 12, 2023

(54) FIREWOOD SLING

(71) Applicant: HighRoad Adventure Gear LLC, Gilbert, AZ (US)

(72) Inventors: David M. Barber, Gilbert, AZ (US); Nicole R. Barber, Gilbert, AZ (US)

(73) Assignee: HIGHROAD ADVENTURE GEAR LLC, Gilbert, AZ (US)

( * ) Notice: Subject to any disclaimer, the term of this patent is extended or adjusted under 35 U.S.C. 154(b) by 224 days.

(21) Appl. No.: 17/236,310

(22) Filed: Apr. 21, 2021

(65) Prior Publication Data

US 2021/0321754 A1    Oct. 21, 2021

Related U.S. Application Data

(60) Provisional application No. 63/013,213, filed on Apr. 21, 2020.

(51) Int. Cl.
*A45F 5/10* (2006.01)
*B65G 7/12* (2006.01)

(52) U.S. Cl.
CPC ............... *A45F 5/10* (2013.01); *B65G 7/12* (2013.01); *A45F 2005/1013* (2013.01); *A45F 2005/1086* (2013.01)

(58) Field of Classification Search
CPC ............... A45F 5/10; A45F 2200/0566; A45F 2005/1006; A45F 2005/1013; A45F 2005/1086; B65G 7/12; B65D 63/18
USPC ........................................ 294/150, 152, 165
See application file for complete search history.

(56) References Cited

U.S. PATENT DOCUMENTS

| | | | | |
|---|---|---|---|---|
| 2,397,433 A | * | 3/1946 | Reeves | A45F 5/10 16/114.1 |
| 4,054,166 A | * | 10/1977 | Burke | A47G 33/045 224/602 |
| 4,950,014 A | * | 8/1990 | Smith | A45F 5/10 294/152 |
| 5,251,945 A | * | 10/1993 | Stoops | A45C 7/0095 D34/28 |
| 5,590,775 A | * | 1/1997 | Moore | B65D 65/08 47/84 |
| 5,823,594 A | * | 10/1998 | Hayes | A45F 5/00 294/142 |
| 5,863,088 A | * | 1/1999 | Kelly, Sr. | A45F 4/02 294/146 |

(Continued)

OTHER PUBLICATIONS

Advertisement for INNO STAGE Waxed Canvas Log Carrier Tote Bag, 40" X 19" Firewood Holder, Amazon.com, retrieved from the Internet on Apr. 28, 2022.

(Continued)

*Primary Examiner* — Dean J Kramer
(74) *Attorney, Agent, or Firm* — Lowe Graham Jones PLLC

(57) ABSTRACT

A firewood sling includes a sheet of material with tensioners on opposing edges with a handle at one end. One or more roll straps are secured to the sheet and include fastening portions, at least one of which is adjustable in position. Pockets may be provided on one edge to receive cords engaging cord locks to form the tensioners. The pockets may include fasteners for holding them closed. The sling may include a wear resistant center portion and flexible side portions.

18 Claims, 7 Drawing Sheets

(56) References Cited

U.S. PATENT DOCUMENTS

| | | | | |
|---|---|---|---|---|
| 7,229,112 | B2 * | 6/2007 | Grbic | A45C 13/30 |
| | | | | 294/157 |
| 8,544,922 | B1 * | 10/2013 | Huzar | B65D 85/52 |
| | | | | 294/157 |
| 10,251,504 | B1 * | 4/2019 | Sutton | B65F 1/002 |
| 10,464,727 | B1 * | 11/2019 | Rerecich | B65D 63/10 |
| 10,524,560 | B2 * | 1/2020 | Hanson | A45C 7/0077 |
| 2004/0081373 | A1 * | 4/2004 | Nykoluk | A45C 3/00 |
| | | | | 383/2 |

OTHER PUBLICATIONS

Advertisement for GALAFIRE Wood Carrier for Firewood with Handles, Foldable 16oz Canvas Firewood Sling Bag, Amazon.com, retrieved from the Internet on Apr. 28, 2022.

Advertisement for Geisofu Firewood Bag Log Carrier, Waxed Canvas Durable Large Fire Log Tote, Amazon.com, retrieved from the Internet on Apr. 28, 2022.

\* cited by examiner

FIREWOOD SLING

PRIORITY CLAIM

This application claims priority to U.S. Application Ser. No. 63/013,213 filed Apr. 21, 2020, and entitled FIREWOOD SLING.

FIELD OF THE INVENTION

This application relates to slings with handles and, more particularly, for slings used in transporting firewood.

BACKGROUND OF THE INVENTION

Many outdoor activities are centered around a campfire fueled by wood. The campfire may be for entertainment, cooking, or for heat. In other scenarios, a wood stove is used. The firewood used is often gathered from the environment and may be wet and dirty. Even if clean and dry, firewood will tend to release dust and splinters. Some have offered firewood slings for transporting firewood. A typical firewood sling consists of a rectangular piece of material with handles on opposing edges.

It would be an advancement in the art to provide a firewood sling having improved utility and functionality.

SUMMARY OF THE INVENTION

In one aspect of the invention, a firewood sling includes a sheet of material having a left end and a right end. A top tensioner is secured to the sheet of material and extends between the left end and the right end. A bottom tensioner is secured to the sheet of material and extends between the left end and the right end, the bottom tensioner being offset from the top tensioner by at least 16 inches. A handle is secured to the sheet of material near the right end.

A roll strap may be secured to the sheet of material and include a first fastener portion and a second fastener portion securable to the first fastener portion. The roll strap may have a length between the first fastener portion and the second portion at least as great as a length of the sheet between the right end and the left end. The first fastener portion may be adjustably positioned along the roll strap. The first fastener portion and the second fastener portion may be configured as a side-release buckle.

In some embodiments, the roll strap is secured to the sheet of material only between the right end and a midpoint of the sheet of material between the right end and the left end.

The sheet of material may be rectangular and include a top edge extending between the left end and the right end and a bottom edge extending between the left end and the right end. A portion of the roll strap may be secured to the sheet of material between the top edge and the bottom edge and substantially parallel to the top edge and the bottom edge.

In some embodiments, the roll strap is a first roll strap, the firewood sling further including a second roll strap. A portion of the second roll strap may be secured to the sheet of material between the top edge and the bottom edge offset from the portion of the first roll strap secured to the sheet of material, the handle being positioned between the first roll strap and the second roll strap.

In some embodiments, first stitching secures both a top end of the handle and the first roll strap to the sheet of material and second stitching secures both a bottom end of the handle and the second roll strap to the sheet of material. In some embodiments, the handle is formed by a handle strap. The handle strap may further form a first loop extending outwardly from the first roll strap toward the top edge and a second loop extending outwardly from the second roll strap toward the bottom edge.

In some embodiments, the sheet of material is rectangular and includes a top edge extending between the left end and the right end and a bottom edge extending between the left end and the right end. The top tensioner may include a top sleeve formed along the top edge, a top cord positioned within the top sleeve, and a top cord lock configured to selectively adjust a length of the top cord positioned within the top sleeve. The bottom tensioner may include a bottom sleeve formed along the bottom edge, a bottom cord positioned within the bottom sleeve, and a bottom cord lock configured to selectively adjust a length of the bottom cord positioned within the bottom sleeve.

In some embodiments, a top pocket is secured to the sheet of material abutting the right end and is positioned to receive a portion of the top cord. A bottom pocket may be secured to the sheet of material abutting the right end and may be positioned to receive a portion of the bottom cord. Top fasteners may be configured to selectively close the top pocket and bottom fasteners may be configured to selectively close the bottom pocket.

In some embodiments, the sheet further includes a center portion extending between the left end and the right end. A top side portion extends between the left end and the right end and may be secured to a top side of the center portion. A bottom side portion may extend between the left end and the right end and may be secured to a bottom side of the center portion. The center portion may be more wear resistant than the top side portion and the bottom side portion. The top side portion and the bottom side portion may be more flexible than the center portion. In some embodiments, a width of the center portion between the top side of the center portion and the bottom side of the center portion is at least 16 inches. In some embodiments, the top tensioner is secured to the top side portion and the bottom tensioner is secured to the bottom side portion.

In another aspect of the invention, a method includes rolling the left end of the sheet of material around the firewood. Tension may be applied to the top tensioner such that a top side of the sheet of material is drawn circumferentially inward on a first side of the firewood. Tension may be applied to the bottom tensioner such that the bottom side of the sheet of material is drawn circumferentially inward on a second side of the firewood.

In some embodiments, the roll strap is wrapped around the sheet of material following the rolling the left end of the sheet of material around the firewood. The method may include adjusting a position of the first fastener portion along the roll strap. The first fastener portion may be secured to the second fastener portion.

In some embodiments, applying tension to the top tensioner such that the top side of the sheet of material is drawn circumferentially inward on the first side of the firewood includes drawing both the top side portion and part of the center portion circumferentially inward on the first side of the firewood. Applying tension to the bottom tensioner such that the bottom side of the sheet of material is drawn circumferentially inward on the second side of the firewood may include drawing both the bottom side portion and part of the center portion circumferentially inward on the second side of the firewood.

In some embodiments, the method includes inserting a portion of the top tensioner in the top pocket and inserting a portion of the bottom tensioner in the bottom pocket.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
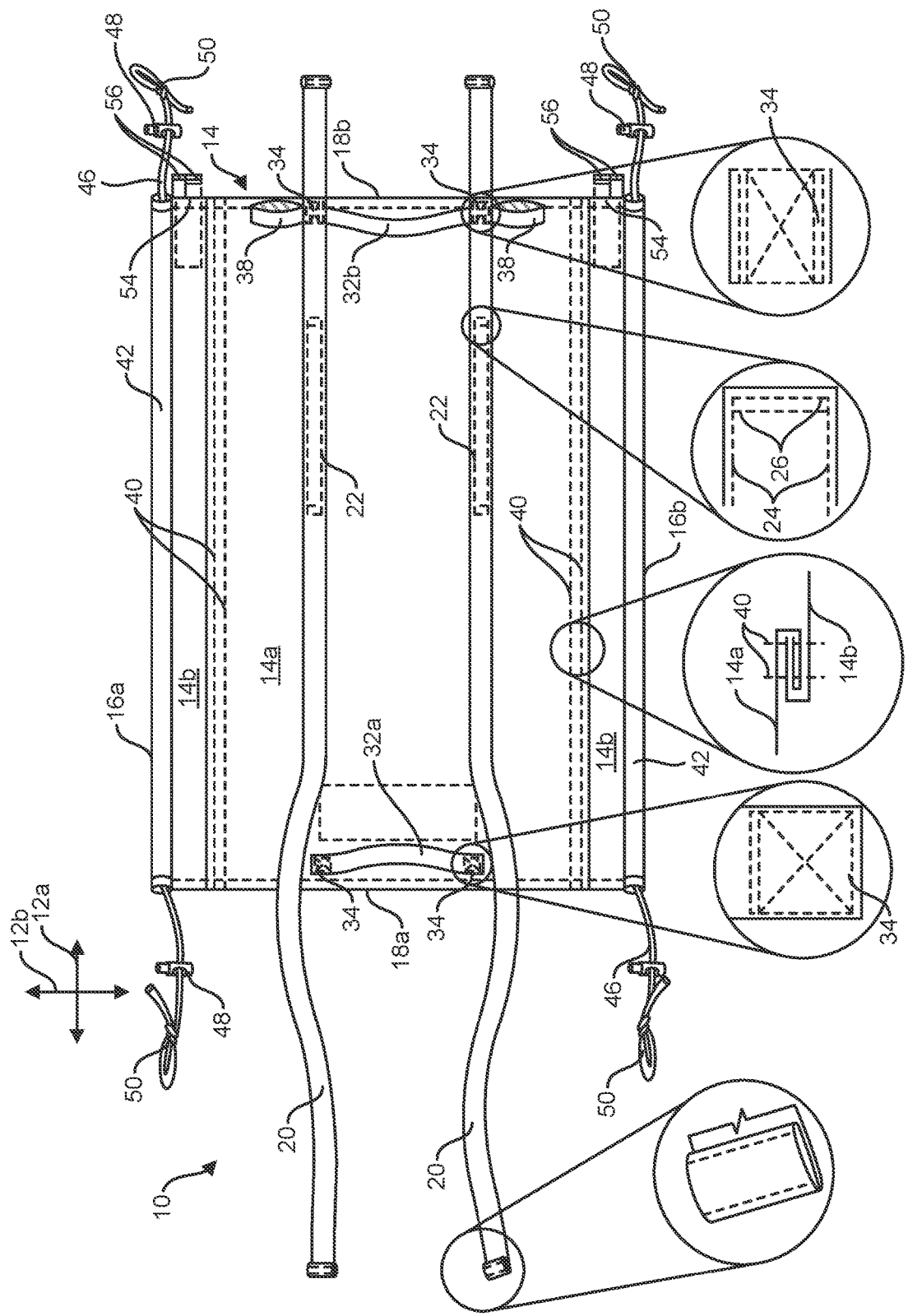
FIG. 1 illustrates an outer side of a firewood sling in accordance with an embodiment of the present invention.
Figure 2:
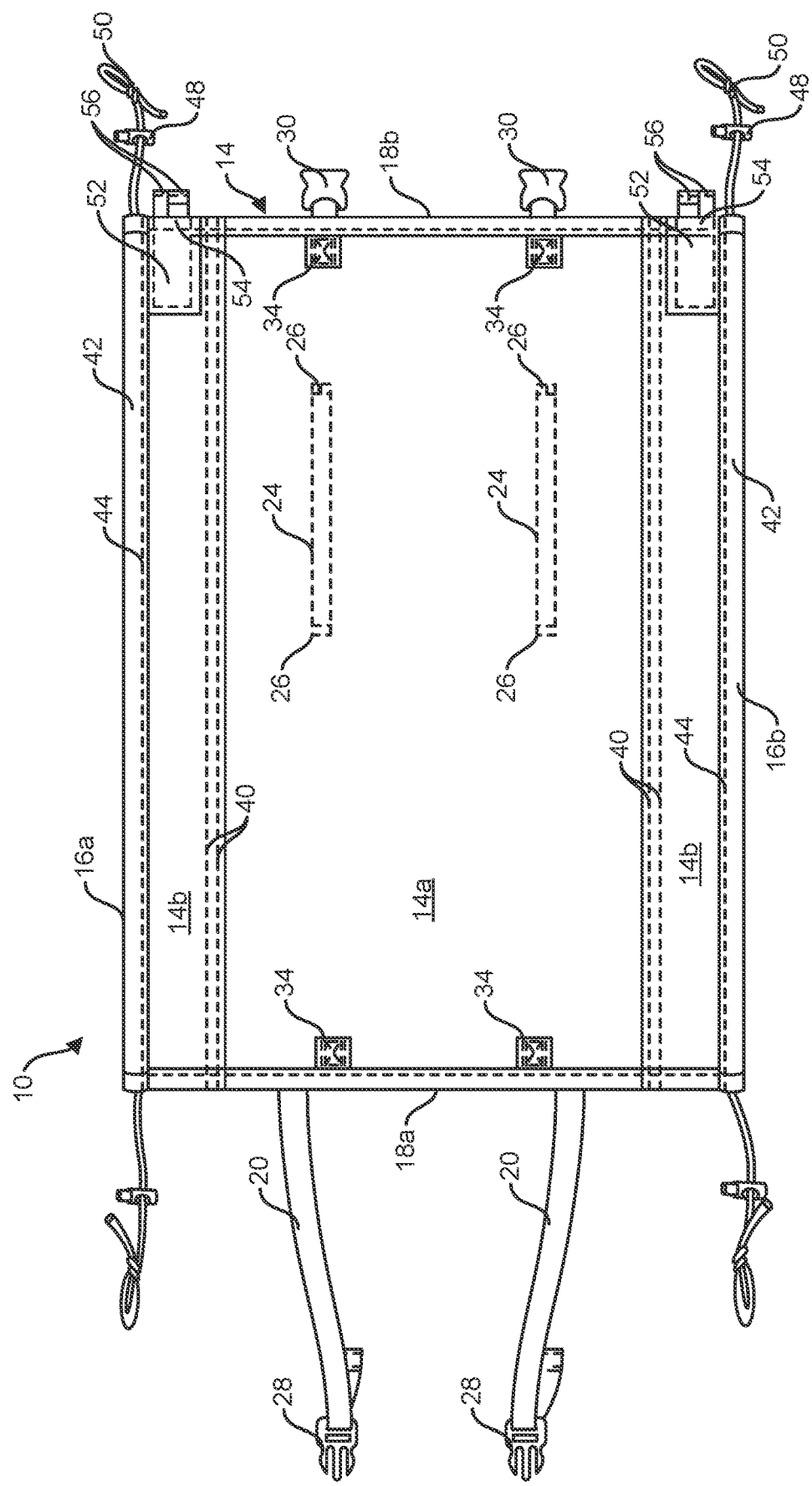
FIG. 2 illustrates an inner side of the firewood sling in accordance with an embodiment of the present invention.

Referring to FIGS. 1 and 2, a firewood sling 10 may be understood with respect to a longitudinal direction 12a and a transverse direction 12b. As used herein, "longitudinal dimension" shall be understood to refer to a dimension parallel to the longitudinal direction and "transverse dimension" shall be understood to refer to a dimension parallel to the transverse direction. References to directions and locations such as top, bottom, left, and right as used herein are used to show relative locations but shall not be understood as requiring any particular orientation of the firewood sling 10 during use.

The firewood sling 10 may include a sheet 14 that is substantially rectangular with edges 16a, 16b substantially parallel to the longitudinal direction 12a and edges 18a, 18b substantially parallel to the transverse direction 12b. As used herein "substantially" with reference to an angle (e.g., parallel, or perpendicular) shall be understood to be within 5 degrees of the angle. In the illustrated embodiment, sheet 14 is longer in the longitudinal direction 12a than in the transverse direction 12b. For example, the longitudinal dimension may be between 1.5 and 2.5 times the transverse dimension. For example, the longitudinal dimension may be between 50 and 65 inches and the transverse dimension may be between 24 and 36 inches.

In the illustrated embodiment, the sheet 14 includes a center portion 14a and two side portions 14b on either side of the center portion 14a along the transverse direction 12b. The center portion 14a may be made of different material than the side portions 14b. In particular, the center portion 14a may be less flexible and more wear resistant than the side portions 14b. For example, the center portion 14a may be made of vinyl coated polyester, marine vinyl, urethane-backed CORDURA, or waxed canvas. The side portions 14b may be made of, for example, nylon, packcloth, or polyester CORDURA. The center portion 14a may be wider along the transverse direction 12b than the side portions 14b and may be wider in the transverse direction 12b than the combined extent of the side portions 14b.

A standard length for cut firewood is 16 inches. The transverse dimension of the center portion 14a may therefore be greater than 16 inches, such as between 17 and 20 inches. The remainder of the transverse dimension of the sheet 14 may comprise the side portions 14b that may be substantially equal (e.g., within 1 inch) in width to one another. For example, for center portion 14a having a width of 20 inches, the side portions 14b may have transverse dimension of 5 inches.

One or more roll straps 20 may secure to an outward facing surface of the sheet 14 (the surface facing outward when firewood is wrapped within the firewood sling 10). The roll straps 20 may be used to maintain the sheet 14 in a rolled configuration around firewood or for storage when empty. As is apparent, the roll straps 20 may be secured to the sheet 14 substantially parallel to the longitudinal direction 12a. The roll straps 20 have free ends that are not secured to the sheet 14 and may be extended beyond the edges 18a, 18b.

The roll straps 20 may have a transverse dimension of 1 to 2 inches, such as 1.5 inches. When extended parallel to the longitudinal direction 12a, each roll strap 20 may extend beyond the edge 18a by between 0.1 and 0.8 times the longitudinal dimension of the sheet 14. For example, for a longitudinal dimension of 57 inches for the sheet 14, the roll strap 20 may extend beyond the edge 18a by 10 inches. When extended parallel to the longitudinal direction 12a, each roll strap 20 may extend beyond the edge 18a by a sufficient amount to secure to a fastener portion and allow some movement of the fastener portion relative to the sheet 14 to facilitate attachment of the fastener portion. For example, the portion of the roll strap 20 extending beyond the edge 18b by between 4 and 8 inches. Note that a portion at each end of each roll strap 20 may be folded or rolled and stitched in order to prevent removal of a fastener portion. The lengths specified in this paragraph may refer to the length of the roll strap after folding or rolling.

In the illustrated embodiment, there are two roll straps 20. However, a single roll strap 20 or three or more roll straps 20 may be used. The roll straps 20 may be offset inwardly from both edges of the center portion 14a substantially parallel to the longitudinal direction 12a and also offset from one another along the transverse direction 12b. For example, the outboard edge of each roll strap 20 may be offset from one of the edges 16a, 16b by between 25 and 60 percent, preferably about 45%, of the transverse dimension of the center portion 14a.

A portion 22 of each roll strap 20 may be secured to the center portion 14a. However, the length of the portion 22 of each roll strap 20 secured to the center portion 14a may be less than 40 percent of the longitudinal dimension of the center portion 14a, such as between 20 and 35 percent of the longitudinal dimension of the center portion 14a. For example, for a longitudinal dimension of 57 inches, the portion 22 may have a length of 16 inches.

The portion 22 may be offset from edge 18a a greater extent than the portion 22 is offset from the edge 18b. In this manner, the portion of the center portion 14a between the edge 18a and the portion 22 is separable from the roll strap 20 and may be wrapped around differently sized bundles of firewood while allowing the roll strap 20 to be drawn through a buckle to tightly secure the bundle of firewood. For example, the offset between edge 18a and the portion 22 may be at least 50 percent of the longitudinal dimension of the center portion 14a. The portion 22 may extend completely to the edge 18b or may be offset therefrom, such as by between 6 and 14 inches, preferably 12 inches.

The portion 22 of each strap 20 may be secured by two rows of stitching 24 extending along the longitudinal direction 12a. At either end of the portion 22, e.g., within 0.5 inches, two or more rows of stitching 26 may extend between the rows 24 in the transverse direction 12b.

One end of each roll strap 20 may be secured to a fastener portion 28 (see FIG. 2) and the other end secured to a fastener portion 30 configured to releasably fasten to the fastener portion 30. In the illustrated embodiment, the fastener portions 28, 30 form a side release buckle, though other types of buckles or other fasteners may be used. The fastener portion 28 secures to the roll strap 20 such that the extent of the roll strap between the portion 22 and the fastener portion 28 may be adjusted according to the amount of firewood enveloped in the firewood sling 10. For example, the fastener portion 28 may include a one-, two- or three-bar slide buckle through which the roll strap 20 passes.

In some embodiments, a handle 32a secures to the center portion 14a near the edge 18a and a second handle 32b secures near the edge 18b (e.g., "near" may be defined as within 2 inches, preferably within 1 inch). In use, the handle 32a may often be rolled up with firewood enveloped in the firewood sling 10. Accordingly, in some embodiments, a single handle 32b is used. The two areas of stitching 34 securing the ends of each handle 32a, 32b to the center portion 14a may be offset from one another along the transverse direction 12b. The stitching 34 may secure the handle 32a directly to the center portion 14a. The stitching 34 may secure both the handle 32b and the roll straps 20 to the center portion 14a.

In some embodiments, loops 38 are also secured to the center portion 14a by the stitching 34, e.g., the illustrated box stitching, securing the handle 32b to the center portion 14a in FIG. 1. The loops 38 may be positioned such that each extends outwardly from the part of the center portion 14a positioned between the roll straps 20. The loops 38 may be formed of the same piece of material forming the handle 32b. The loops 38 may be used to tie down the firewood sling 10 to a vehicle, suspend the firewood sling 10, or perform other functions. The handles 32a, 32b and loops 38 may all be formed of 1.5 inch straps, though other widths may be used and the handles 32a, 32b, and loops 38 may be made of loops of different widths.

The side portions 14b may be secured to the center portion 14a by stitching 40. For example, edges of the portions 14b may be folded over one another and the folded portions secured by one or more rows of stitching 40. The side portions 14b may each further define a sleeve 42. For example, the sleeve 42 may be formed by folding an edge portion of the side portion 14b and securing the edge portion to the side portion 14b by means of stitching 44.

A tension cord 46 may be positioned within each sleeve 42 and a cord lock 48 may be used to adjust the length of the cord 46 within the sleeve 42. For example, an end of the tension cord 46 on an opposite end of the sleeve 42 from the cord lock 48 may include a knotted portion 50, be stitched to the sleeve 42 or elsewhere on the sheet 14, or include another structure secured thereto that prevents that end of the tension cord 46 from passing into the sleeve 42. In the illustrated embodiment, the cord lock 48 is located nearest the edge 18b that is exposed when the edge 18a is rolled up within the sheet 14. In some embodiments, there are cord locks 48 and/or knotted portions 50 at both ends of the tension cord 46.

Figure 3:
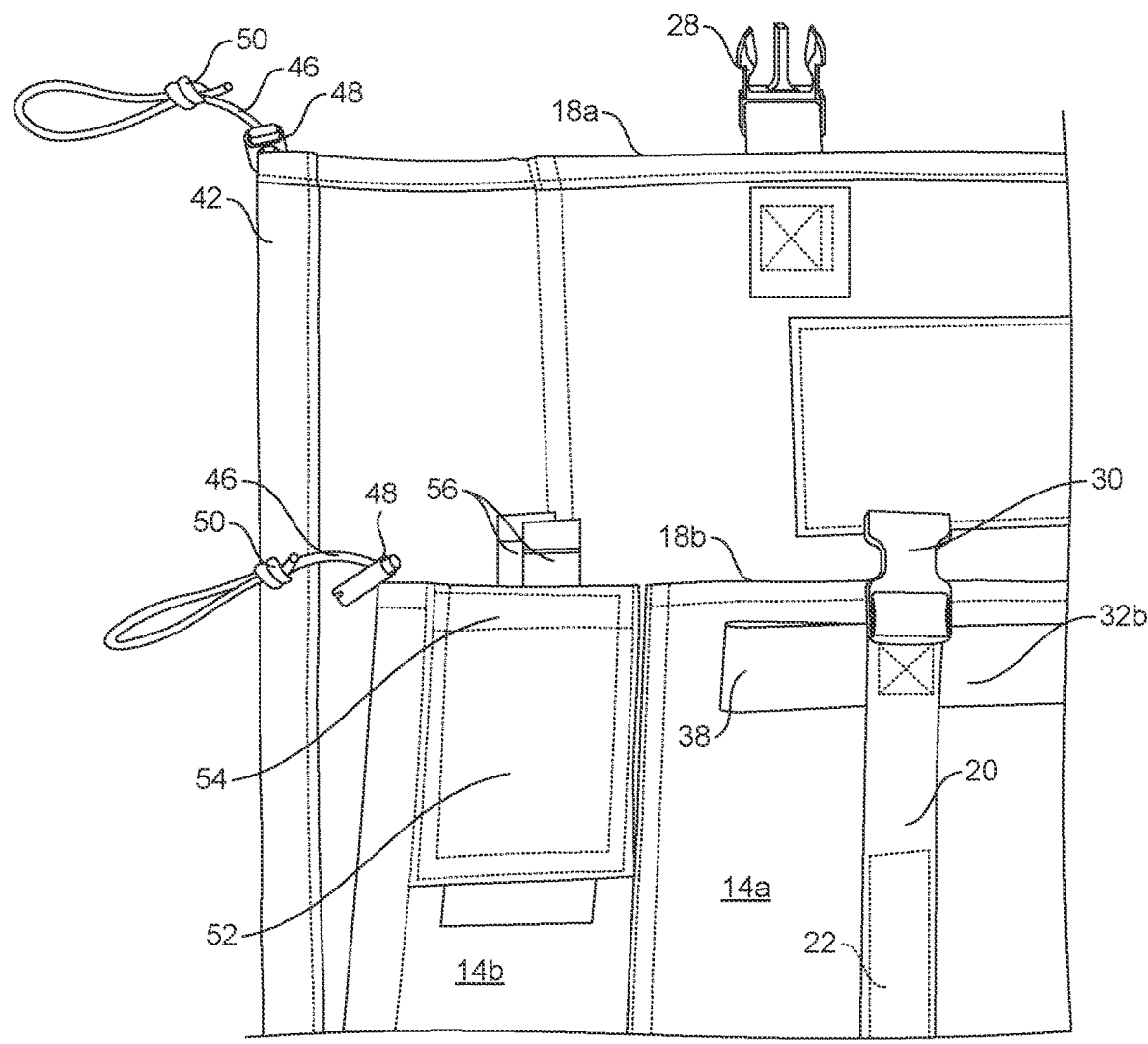
FIG. 3 is a partial view of the firewood sling in accordance with an embodiment of the present invention.

Referring to FIG. 3, while still referring to FIGS. 1 and 2, as the tension cord 46 is drawn through the cord lock 48, there may be a large length of tension cord 46 extending out of the sleeve 42. A pocket may be formed on the sheet, such as on each side portion 14a,14b. The opening of each pocket may face the edge 18b or be formed by the edge 18b. For example, the pocket may be formed by a piece 52 secured to the side portion 14b adjacent the sleeve 42. Opposing sides of the pocket may include fastener portions 54, such as hook-and-loop fastening material (e.g., VELCRO), portions of a snap fastener, or other fastener portions. A portion of the cord 46 extending out of the sleeve 42 may be inserted into the pocket and the fastener portions 54 may be engaged to retain the portion of the cord 46 within the pocket. Tabs 56 may also secure to opposite sides of the pocket, protrude outwardly from the pocket, and/or be offset from one another along the transverse direction 12b. This may enable a user to easily grasp the tabs 56 in order to disengage the fastener portions 54.

Figure 4:
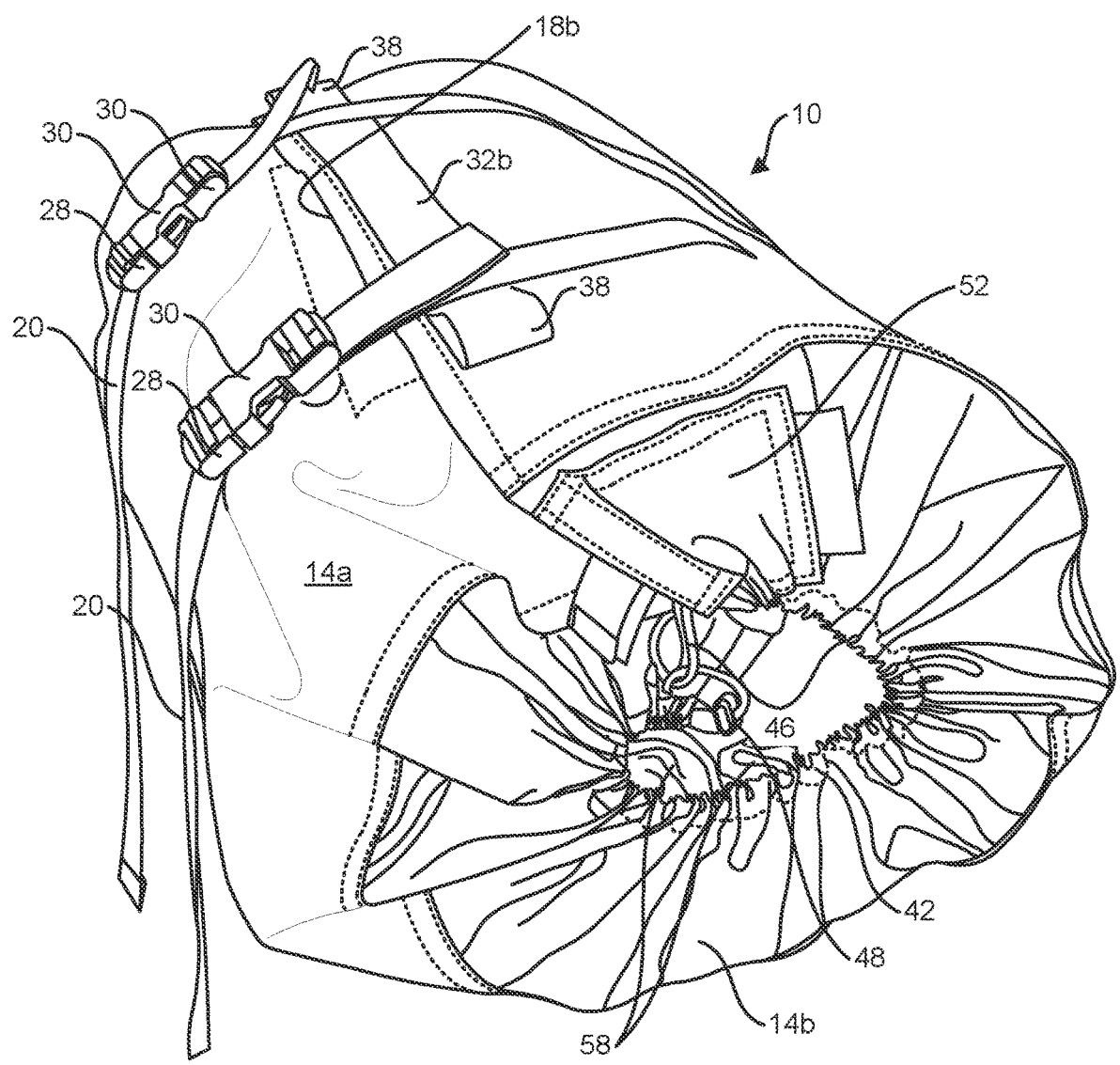
FIG. 4 is an isometric view of the firewood sling containing firewood of a standard length in accordance with an embodiment of the present invention.

FIG. 4 illustrates the firewood sling 10 in use. The center portion 14a may be wrapped around firewood 58, with edge 18a rolled around the firewood 58 first and leaving edge 18b exposed. In the illustrated use case, the firewood 58 has a length less than the transverse dimension of the center portion 14a such that the center portion 14a extends outwardly on either side of the firewood 58. As the cords 46 are tensioned and held with the cord lock 48, the side portions 14b are pursed, thereby retaining the firewood 58 and debris within the firewood sling 10. The free end of the cord 46 may then be inserted within the pocket formed by the material 52 and held in place with the fastening material 54. The roll straps 20 may also be tensioned by drawing them through the buckle of the fastener portion 28. Note that in the illustrated embodiment, center portion 14a may be drawn inwardly around the ends of the firewood 58. The center portion 14a may be more wear resistant than the side portions 14b and may be sized in order to enable this to occur for a standard length (e.g., 16 inches) for cut firewood. Other actions that may be performed may include securing the firewood sling 10 to a vehicle using the straps 38 or some other means. When in the illustrated configuration, the firewood sling 10 may be easily carried using the handle 32b, which remains exposed after rolling up. Alternatively, if the sling 10 is rolled tight or if the load is in excess of the rolled capacity, the sling 10 may be carried by using both handles 32a and 32b.

Figure 5:
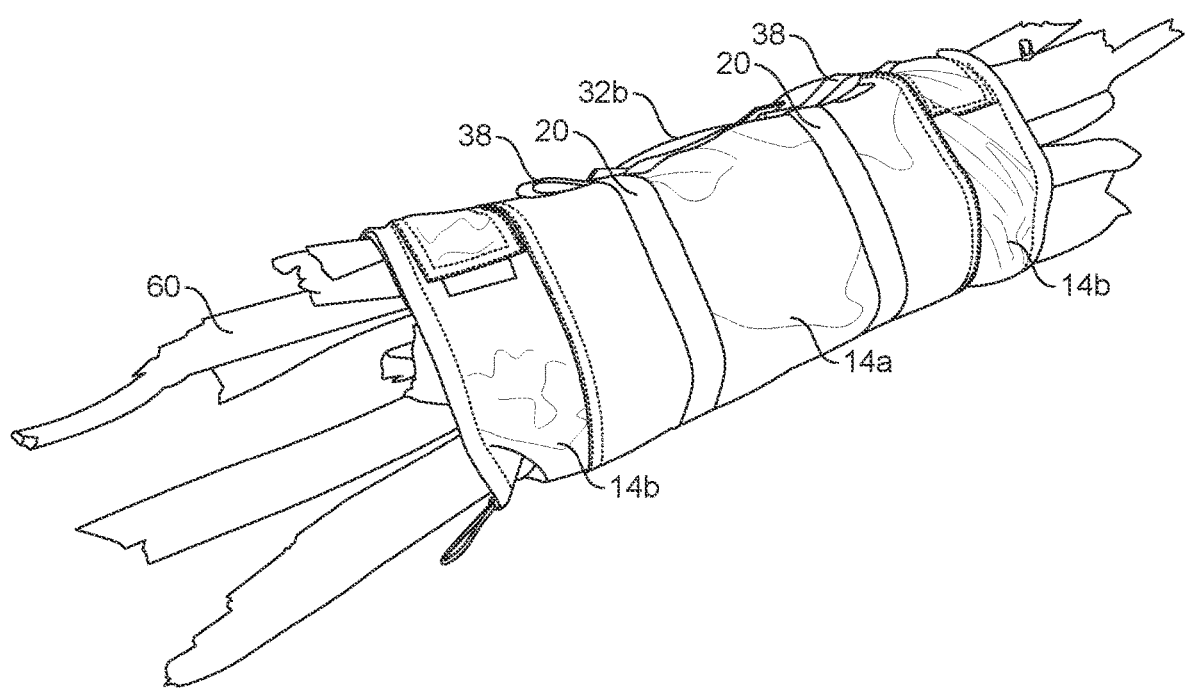
FIG. 5 is an isometric view of the firewood sling containing firewood exceeding a standard length in accordance with an embodiment of the present invention.

FIG. 5 illustrates an alternative use of the firewood sling 10 for firewood 60 that is wider than one or both of the center portion 14a and the combined width of the center portion 14a and the side portions 14b. The firewood 60 may be rolled up in the sheet 14 in the same manner as for FIG. 4. In the illustrated configuration, the tension cords 46 may be untensioned, or only partially tensioned relative to the pursing achieved for standard length firewood as shown in FIG. 4. The roll straps 20 may be tensioned as described with respect to FIG. 4 to retain the firewood 60. The firewood sling 10 may be carried using the handle 32b in the same manner as for FIG. 4.

Figure 6:
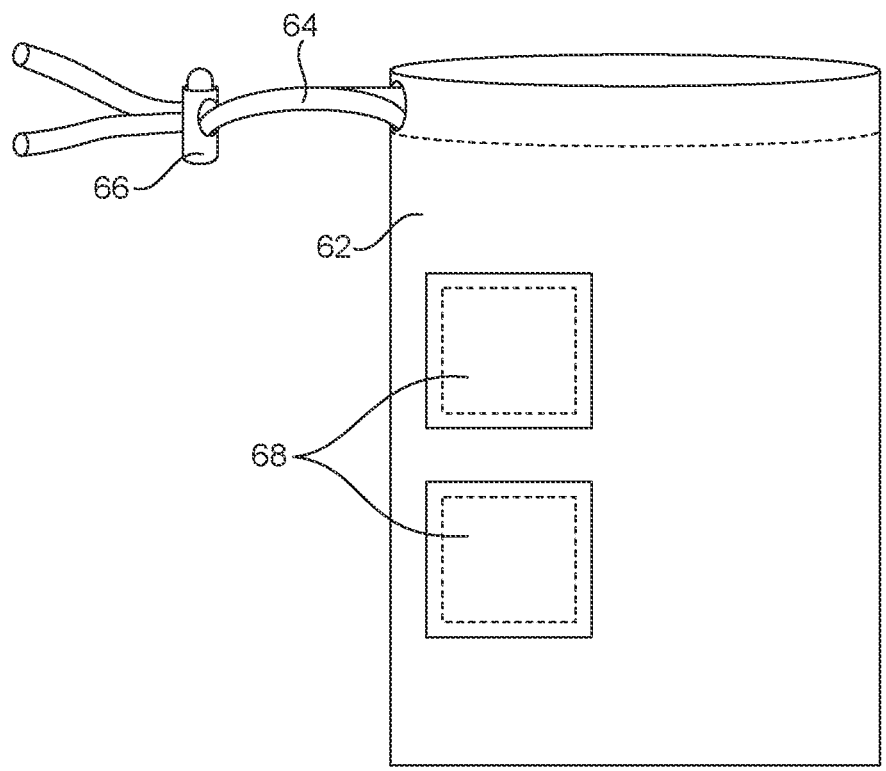
FIG. 6 is a front view of a kindling pouch.

Referring to FIG. 6, in some embodiments, a kindling pouch 62 may be used in combination with the firewood sling 10. The kindling pouch 62 may be used to collect small combustible items such as leaves, paper, pine needles, and small twigs. The kindling pouch 62 may store such items that might otherwise escape from the firewood sling 10 during transport. The kindling pouch 62 may be closed by means of a draw string 64 and cord lock 66, though other closure mechanisms may also be used. Various sizes may be used, such as a height of from 15 to 20 inches and a width of from 10 to 15 inches for the orientation shown in FIG. 6. One or more areas of fastening material 68 may secure to the pouch 62 and may engage corresponding fastening material secured to an inward facing surface of the sheet 14, such as on the center portion 14a.

Figure 7:
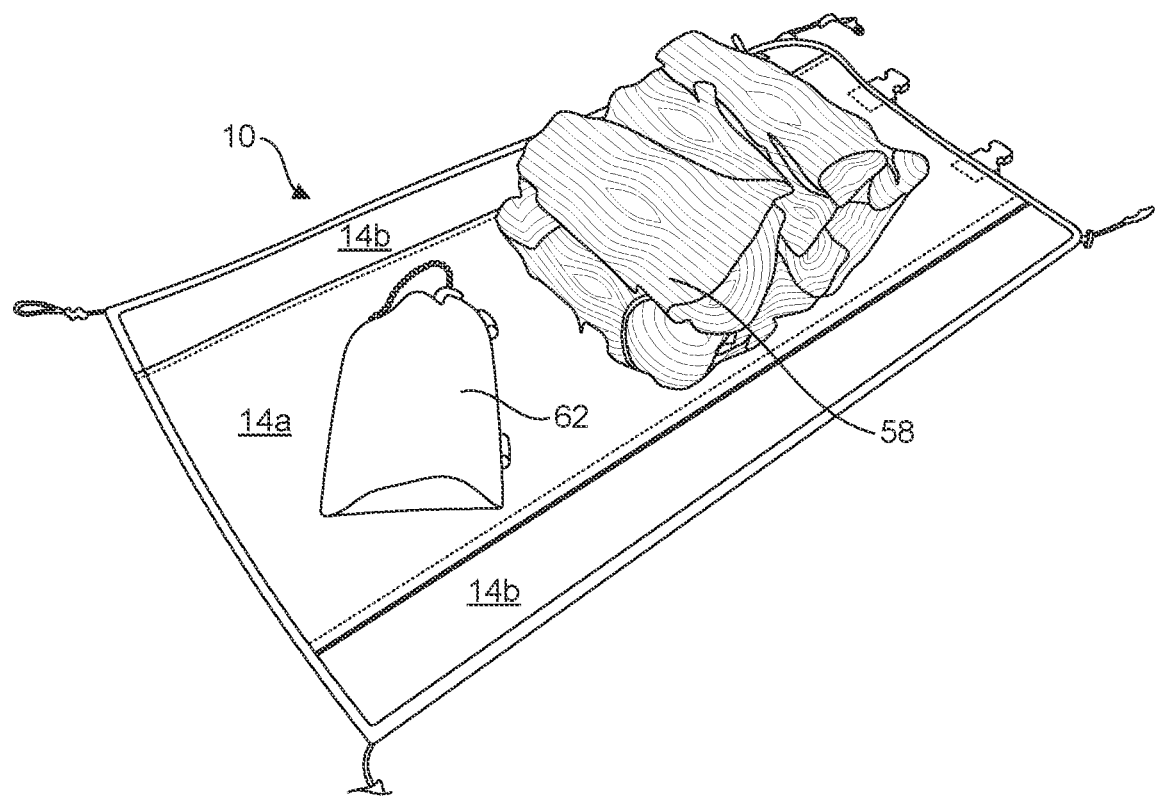
FIG. 7 is an isometric view of the kindling pouch in use with the firewood sling in accordance with an embodiment of the present invention.

Referring to FIG. 7, in use, the kindling pouch 62 may be placed within the firewood sling 10 and rolled up along with firewood 58, 60 as described above with respect to FIG. 4 or 5.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A firewood sling comprising:
   a sheet of material having a left end and a right end;
   a top tensioner secured to the sheet of material and extending between the left end and the right end;
   a bottom tensioner secured to the sheet of material and extending between the left end and the right end, the bottom tensioner being offset from the top tensioner;
   a handle secured to the sheet of material near the right end; and
   a roll strap secured to the sheet of material and including a first fastener portion and a second fastener portion securable to the first fastener portion, the roll strap having a length between the first fastener portion and the second fastener portion at least as great as a length of the sheet between the right end and the left end;
   wherein the roll strap is secured to the sheet of material only between the right end and a midpoint of the sheet of material between the right end and the left end.

2. The firewood sling of claim 1, wherein the bottom tensioner is offset from the top tensioner by at least 16 inches.

3. The firewood sling of claim 1, wherein the first fastener portion is adjustably positioned along the roll strap.

4. The firewood sling of claim 3, wherein the first fastener portion and the second fastener portion are configured as a side-release buckle.

5. The firewood sling of claim 1, wherein the sheet of material is rectangular and includes a top edge extending between the left end and the right end and a bottom edge extending between the left end and the right end, a portion of the roll strap being secured to the sheet of material between the top edge and the bottom edge and substantially parallel to the top edge and the bottom edge.

6. The firewood sling of claim 5, wherein the roll strap is a first roll strap, the firewood sling further comprising:
   a second roll strap secured to the sheet of material a portion of the second roll strap being secured to the sheet of material between the top edge and the bottom edge offset from the portion of the first roll strap secured to the sheet of material, the handle being positioned between the first roll strap and the second roll strap.

7. The firewood sling of claim 6, further comprising:
   first stitching securing both a top end of the handle and the first roll strap to the sheet of material; and
   second stitching securing both a bottom end of the handle and the second roll strap to the sheet of material.

8. The firewood sling of claim 7, wherein the handle is formed by a handle strap, the handle strap further forming a first loop extending outwardly from the first roll strap toward the top edge and a second loop extending outwardly from the second roll strap toward the bottom edge.

9. The firewood sling of claim 1, wherein:
   wherein the sheet of material is rectangular and includes
      a top edge extending between the left end and the right end and a bottom edge extending between the left end and the right end;
   the top tensioner comprises:
      a top sleeve formed along the top edge;
      a top cord positioned within the top sleeve; and
      a top cord lock configured to selectively adjust a length of the top cord positioned within the top sleeve; and
   the bottom tensioner comprises:
      a bottom sleeve formed along the bottom edge;
      a bottom cord positioned within the bottom sleeve; and
      a bottom cord lock configured to selectively adjust a length of the bottom cord positioned within the bottom sleeve.

10. A firewood sling comprising:
    a sheet of material having a left end and a right end, the sheet of material being rectangular and including a top edge extending between the left end and the right end and a bottom edge extending between the left end and the right end;
    a top tensioner secured to the sheet of material and extending between the left end and the right end, the top tensioner comprising:
       a top sleeve formed along the top edge;
       a top cord positioned within the top sleeve; and
       a top cord lock configured to selectively adjust a length of the top cord positioned within the top sleeve;
    a bottom tensioner secured to the sheet of material and extending between the left end and the right end, the bottom tensioner being offset from the top tensioner by at least 16 inches, wherein the bottom tensioner comprises:
       a bottom sleeve formed along the bottom edge;
       a bottom cord positioned within the bottom sleeve; and
       a bottom cord lock configured to selectively adjust a length of the bottom cord positioned within the bottom sleeve;
    a top pocket secured to the sheet of material abutting the right end and positioned to receive a portion of the top cord; and
    a bottom pocket secured to the sheet of material abutting the right end and positioned to receive a portion of the bottom cord.

11. The firewood sling of claim 10, further comprising top fasteners configured to selectively close the top pocket and bottom fasteners configured to selectively close the bottom pocket.

12. A firewood sling comprising:
    a sheet of material having a left end and a right end;
    a top tensioner secured to the sheet of material and extending between the left end and the right end;
    a bottom tensioner secured to the sheet of material and extending between the left end and the right end, the bottom tensioner being offset from the top tensioner by at least 16 inches; and
    a handle secured to the sheet of material near the right end;
    wherein the sheet further comprises:
       a center portion extending between the left end and the right end;
       a top side portion extending between the left end and the right end and secured to a top side of the center portion; and a bottom side portion extending between the left end and the right end and secured to a bottom side of the center portion;

wherein the center portion is more wear resistant than the top side portion and the bottom side portion.

13. The firewood sling of claim 12, wherein the top side portion and the bottom side portion are more flexible than the center portion.

14. The firewood sling of claim 12, wherein a width of the center portion between the top side of the center portion and the bottom side of the center portion is at least 16 inches.

15. The firewood sling of claim 12, wherein the top tensioner is secured to the top side portion and the bottom tensioner is secured to the bottom side portion.

16. A method for storing firewood comprising:
providing a firewood sling comprising:
a sheet of material having a left end and a right end;
a top tensioner secured to the sheet of material and extending between the left end and the right end;
a bottom tensioner secured to the sheet of material and extending between the left end and the right end, the bottom tensioner being offset from the top tensioner by at least 16 inches; and
a handle secured to the sheet of material near the right end;
placing the firewood on the sheet of material;
rolling the left end of the sheet of material around the firewood;
applying tension to the top tensioner such that a top side of the sheet of material is drawn circumferentially inward on a first side of the firewood;
applying tension to the bottom tensioner such that a bottom side of the sheet of material is drawn circumferentially inward on a second side of the firewood;
providing a roll strap secured to the sheet of material and including a first fastener portion and a second fastener portion securable to the first fastener portion, the roll strap having a length between the first fastener portion and the second fastener portion at least as great as a length of the sheet between the right end and the left end, the roll strap being secured to the sheet of material only between the right end and a midpoint of the sheet of material between the right end and the left end;
wrapping the roll strap around the sheet of material following the rolling the left end of the sheet of material around the firewood;
adjusting a position of the first fastener portion along the roll strap; and
securing the first fastener portion to the second fastener portion.

17. A method for storing firewood comprising:
providing a firewood sling comprising:
a sheet of material having a left end and a right end;
a top tensioner secured to the sheet of material and extending between the left end and the right end;
a bottom tensioner secured to the sheet of material and extending between the left end and the right end, the bottom tensioner being offset from the top tensioner by at least 16 inches; and
a handle secured to the sheet of material near the right end;
placing the firewood on the sheet of material;
rolling the left end of the sheet of material around the firewood;
applying tension to the top tensioner such that a top side of the sheet of material is drawn circumferentially inward on a first side of the firewood; and
applying tension to the bottom tensioner such that a bottom side of the sheet of material is drawn circumferentially inward on a second side of the firewood;
wherein the sheet further comprises:
a center portion extending between the left end and the right end;
a top side portion extending between the left end and the right end and secured to a top side of the center portion; and
a bottom side portion extending between the left end and the right end and secured to a bottom side of the center portion, the center portion being more wear resistant than the top side portion and the bottom side portion;
wherein applying tension to the top tensioner such that the top side of the sheet of material is drawn circumferentially inward on the first side of the firewood comprises drawing both the top side portion and part of the center portion circumferentially inward on the first side of the firewood; and
wherein applying tension to the bottom tensioner such that the bottom side of the sheet of material is drawn circumferentially inward on the second side of the firewood comprises drawing both the bottom side portion and part of the center portion circumferentially inward on the second side of the firewood.

18. A method for storing firewood comprising:
providing a firewood sling comprising:
a sheet of material having a left end and a right end;
a top tensioner secured to the sheet of material and extending between the left end and the right end;
a bottom tensioner secured to the sheet of material and extending between the left end and the right end, the bottom tensioner being offset from the top tensioner by at least 16 inches; and
a handle secured to the sheet of material near the right end;
placing the firewood on the sheet of material;
rolling the left end of the sheet of material around the firewood;
applying tension to the top tensioner such that a top side of the sheet of material is drawn circumferentially inward on a first side of the firewood; and
applying tension to the bottom tensioner such that a bottom side of the sheet of material is drawn circumferentially inward on a second side of the firewood;
providing a top pocket secured to the sheet of material abutting the right end;
providing a bottom pocket secured to the sheet of material abutting the right end;
inserting a portion of the top tensioner in the top pocket; and
inserting a portion of the bottom tensioner in the bottom pocket.

* * * * *